Jan. 30, 1962 L. E. ELFES 3,018,863
FRICTION CLUTCH MECHANISM
Filed May 29, 1958 3 Sheets-Sheet 1

INVENTOR.
LEE E. ELFES
BY
ATTORNEYS.

Jan. 30, 1962 L. E. ELFES 3,018,863
FRICTION CLUTCH MECHANISM
Filed May 29, 1958 3 Sheets-Sheet 2

INVENTOR.
LEE E. ELFES
BY
ATTORNEYS.

INVENTOR.
LEE E. ELFES
BY
Carlson Pitzner, Hubbard & Wolfe
ATTORNEYS.

United States Patent Office 3,018,863
Patented Jan. 30, 1962

3,018,863
FRICTION CLUTCH MECHANISM
Lee E. Elfes, Birmingham, Mich., assignor to Massey-Ferguson Inc., Racine, Wis., a corporation of Maryland
Filed May 29, 1958, Ser. No. 738,861
Claims priority, application Great Britain Oct. 14, 1957
2 Claims. (Cl. 192—48)

The present invention relates to friction clutch mechanisms in general and more specifically to an improved mechanism of a type providing independent but correlated control of two shafts driven from a common source of power such as a drive shaft and a power-take-off shaft of a tractor.

It is the primary object of the present invention to provide an improved dual friction clutch mechanism of the above character which enables the tractor drive to be engaged or disengaged independently of and without interfering with the power-take-off drive. More specifically, it is an object of the invention to provide an improved clutch mechanism which allows both drives to be engaged and disengaged by the manipulation of a single control member such as a hand lever or foot pedal.

Another object of the present invention is to provide a simplified yet rugged and dependable clutch mechanism of the foregoing characteristics. It is a further object to provide such a clutch mechanism which is economical to produce, install and service. More specifically, it is an object to facilitate the adjustment of such a dual clutch.

Still another object of the present invention is to provide a dual friction clutch mechanism of the above character in which the individual clutch mechanisms are mounted relative to each other so as to provide for the maximum amount of air circulation between them thereby affording adequate cooling when the clutch is operating under a load.

Other objects and advantages of the present invention will become apparent as the following description proceeds, taken in connection with the accompanying drawings wherein.

Figure 1:
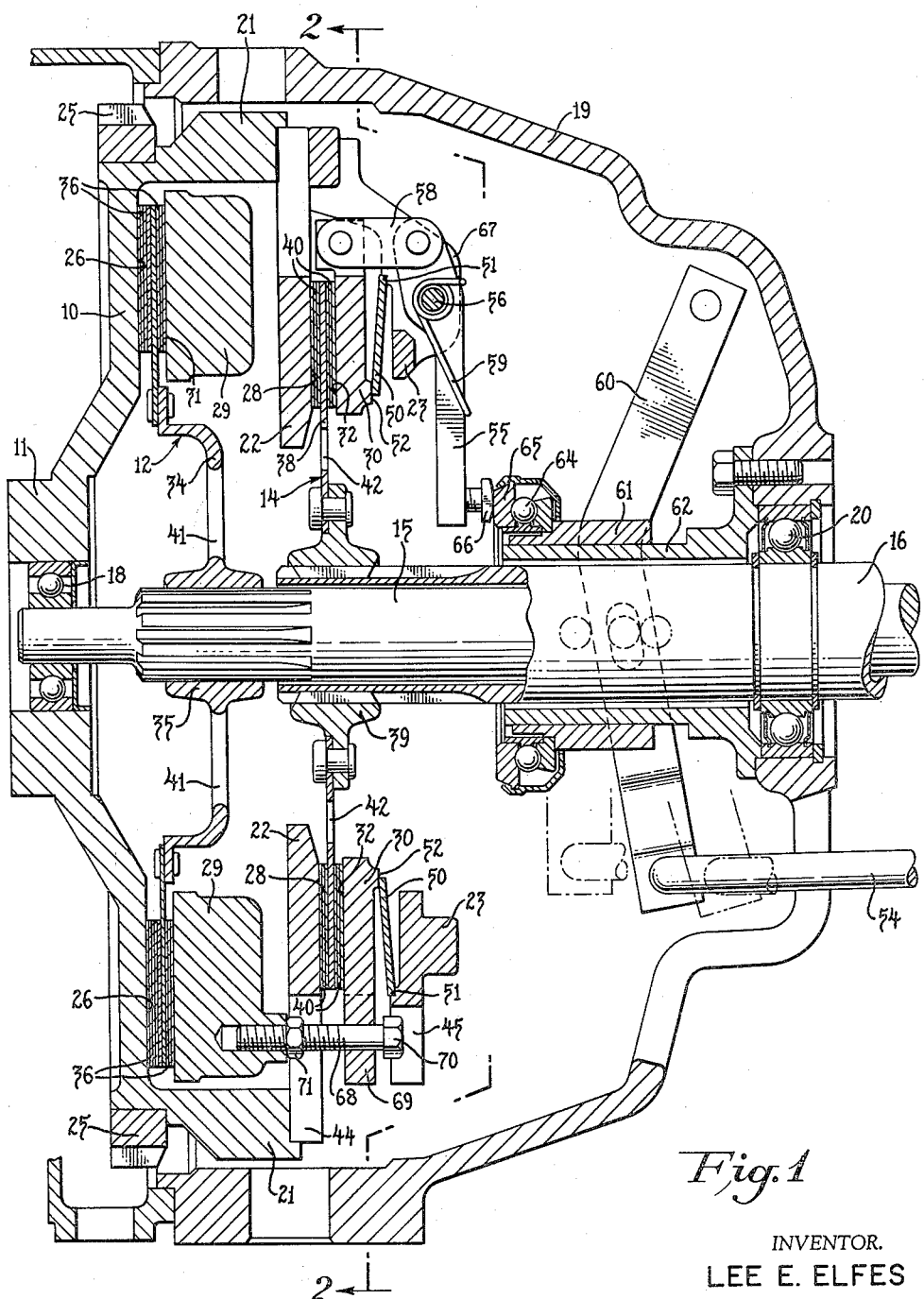
FIGURE 1 is a sectional elevation view of a dual friction clutch mechanism embodying the features of the present invention.

While an illustrative dual friction clutch mechanism constructed in accordance with the present invention has been shown in the drawings and will be described below in considerable detail, it should be understood that there is no intention to limit the invention to the specific form disclosed. On the contrary, the invention is to cover all modifications, alternative constructions, equivalents, and uses falling within the spirit and scope of the invention as expressed in the appended claims.

The exemplary clutch mechanism embodying the present invention includes a rotatable driving member 10 comprising a flywheel having a central annual hub portion 11 adapted to be bolted or otherwise rigidly secured to the crank shaft (not shown) of an engine of a vehicle such as a tractor. Included in the clutch mechanism are two independently engageable and disengageable clutches, namely a front clutch 12 and a rear clutch 14 which respectively provide driving connections from the flywheel 10 to two separate driven shafts 15 and 16. As herein shown, the shaft 16 is tubular and the shaft 15 extends coaxially through it and is piloted at its forward end in a bearing 18 carried in the hub 11 of the flywheel. Surrounding the clutches 12 and 14 and the flywheel 10 is a generally cup shaped casing 19 in which is mounted an anti-friction bearing 20 piloting the outer tubular shaft 16. The front clutch 12, in this instance, is operatively associated with the inner shaft 15 while the rear clutch 14 is operatively associated with the outer tubular shaft 16. When incorporated in a tractor, the tubular shaft 16 may be utilized to drive the ground wheels of the tractor through a change-speed gear transmission while the central, solid shaft 15 is utilized to drive a power-take-off mechanism.

In accordance with the present invention, the clutches 12 and 14 and their operating mechanisms are associated with the flywheel or driving member in a manner which substantially simplifies the construction of the parts, reduces the number of parts required and provides a rugged and dependable clutch mechanism which is economical to produce yet which is capable of operating efficiently under the severe conditions imposed on such a mechanism when used in a tractor. To this end the flywheel 10 is formed with a peripheral flange 21 extending rearwardly therefrom and to which is bolted or otherwise secured an intermediate annular abutment member 22, which is generally parallel to the flywheel 10, and a second or rear annular support member 23 spaced from the intermediate member 22 and also extending generally parallel to the flywheel 10. The peripheral edge of the flywheel may be provided with an external gear 25 for engagement with a starter gear.

The flywheel 10 has its rear face machined to present a flat annular friction driving surface 26 coaxial with the rotational axis of the flywheel. Similarly, the rear face of the intermediate member 22 is also machined to provide a flat annular friction driving surface 28 coaxial with the rotational axis of the flywheel and spaced axially from the front driving surface 26. Thus both the front and rear friction driving surfaces 26 and 28 face in the same direction, that is rearwardly of the clutch mechanisms.

For engaging the clutches there is provided a pair of annular pressure plates namely, a front pressure plate 29 disposed adjacent the front face of the intermediate flywheel member 22 and facing the front friction drivng surface 26, and a rear pressure plate 30 disposed adjacent the front face of the rear flywheel member 23 and facing the rear friction driving surface 28 on the intermediate member 22. The pressure plates may conveniently be of annular form and each is provided with a flat driving surface on its front face in opposed relation to the driving surfaces on the flywheel. While the pressure plates are constrined by suitable means to rotate with the flywheel the coupling employed permits them to be shifted axially toward and from the driving surfaces of the flywheel 10 and intermediate member 22.

In order to drive the central shaft 15 there is provided a front clutch disc or driven element 34 interposed between the friction driving surfaces 26 and 31 and drivingly connected to the shaft 15 by a spline 35. The clutch disc is an annular shaped member having a hub portion 35 splined or otherwise axially slidably but nonrotatably secured to the inner shaft 15. Attached to the marginal edge portion of the member 34 on opposite sides thereof are a pair of friction rings 36 positioned for coaction respectively with the driving surfaces 26 and 31 and operative to provide a driving connection between the flywheel member 10 and the shaft 15 when clamped between the clutch plate 29 and the flywheel 10.

For driving the outer tubular shaft 16 there is provided a rear clutch disc 38 interposed between the driving surface 28 on the intermediate flywheel member 22 and the surface 32 on the rear pressure plate 30. For driving the tubular shaft the disc 38 is an annular shaped member formed with a hub 39 splined or otherwise axially slidable but nonrotatably mounted on the outer shaft and carries at its outer marginal edge a pair of friction rings 40 positioned for coaction with the driving surfaces 28 and 32 and effective to provide a driving connection between the flywheel 10 and the shaft 16 when clamped between the clutch plate 30 and the intermediate member 22.

To provide for air circulation throughout the clutch mechanism the clutch disc 34 is formed with axial openings 41 and the clutch disc 38 is formed with openings 42. Similarly, the intermediate and rear flywheel members 22 and 23 are provided with openings 44 and 45 respectively. These latter openings serve not only for air circulation but afford access to the forward pressure plate 29.

The elements of the front and rear clutches 12 and 14, with the exception of the actuating mechanism (to be described later), are entirely enclosed within the flywheel and casing assembly thus providing a compact structure and affording maximum protection of the clutch elements.

Means are provided for biasing the clutch pressure plates 29 and 30 into engagement with the friction pads 36 and 40 on the clutch discs 34 and 38 respectively for engaging the clutches.

Figure 3:
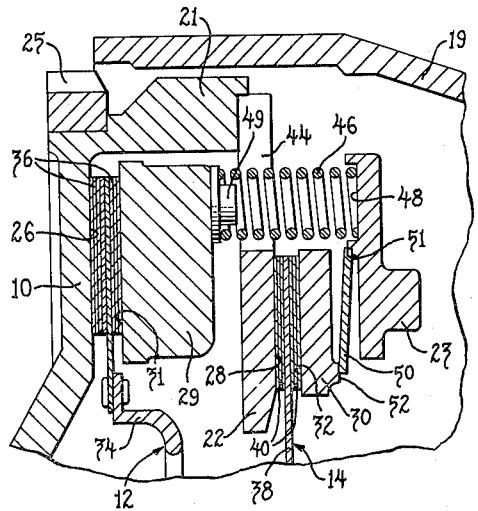
FIGS. 3, 4 and 5 are fragmentary sectional views of the dual clutch mechanism showing respectively both clutches engaged, the rear clutch disengaged, and both clutches disengaged.

In the preferred form of the clutch mechanism, this means comprises independent spring means biasing the front and rear pressure plates to the clutch engaging position, that is both the front and rear clutches are normally engaged. In order to simplify the spring mounting, support for the independent spring means is provided by the rear annular flywheel plate 23. The front pressure plate 29 is biased by a plurality of circumferentially disposed helical coil springs 46. These springs are seated in appropriate circular recesses 48 in the member 23 and are provided with spring retainers 49 engaging the rear face of the pressure plate 29 (FIG. 3). One particular advantage obtained by the use of coil springs for this purpose, in addition to the advantage of the rear plate mounting, is in the increased air circulation around the front clutch and the clutch remains cooler during use.

While any suitable spring means may be utilized for biasing the rear pressure plate 30 to its clutch engaging position, it is preferred to employ an annular spring 50 of the type commonly known as a Belleville spring. As shown, the spring 50 is interposed between a shoulder 51 on the support member 23 and a rearwardly extending flange 52 adjacent the inner marginal edge of the pressure plate 30. As pointed out above, the springs 50 and 46 are normally effective to maintain the front and rear clutches engaged for driving the shafts 15 and 16.

A clutch actuating mechanism is provided for relieving one or both pressure plates of spring pressure thereby to disengage one of the clutches or both of the clutches simultaneously. In the exemplary embodiment of the clutch mechanism, pressure on the plate 30 is relieved to disengage the clutch 14 on the tubular tractor transmission shaft 16 while maintaining spring pressure on the plate 29 to keep the power-take-off clutch 12 engaged. This permits the tractor to be stopped or the drive to be interrupted for shifting gears without interfering with the functioning of the power-take-off mechanism, which is advantageous in the operation of combines and comparable implements. Alternatively, pressure on both plates may be relieved to disengage both of the clutches and thus stop the tractor and the power-take-off mechanism. The present invention simplifies and facilitates the operation of the clutches by providing a novel actuating mechanism wherein one or both of the clutches may be actuated through the unidirectional shifting of a single shifting operable member, wherein the extent of movement thereof determines whether one or both of the clutches are actuated. The operating member may be of any suitable type such as a hand lever or foot pedal.

The clutch actuating mechanism is connected to the hand lever or foot pedal by a clutch rod 54 which acts through a linkage mechanism to retract the clutch plates 30 and 29 to disengage first and rear clutch and then the front clutch. Reengagement of the clutches results from the action of the biasing springs upon the release of the clutch arm 54.

For disengaging the rear clutch pressure plate 30 and thereby the clutch disc 38, the pressure plate is connected to a throw-out lever 55, pivoted at 56 on the rear annular support 23, by means of a connecting link 58. Forward movement of the throw-out lever 55 pulls on the link 58 to retract the clutch pressure plate 30, a torque spring 59 being provided to take up the slack in the pivot linkages.

Operatively connecting the throw-out lever 55 to the clutch arm 54 is an operator arm 60 pivotally connected at one end to the arm 54 and at its other end to the casing 19. Intermediate its ends, the operator arm swingably engages a collar 61 mounted for axial sliding movement on a sleeve 62 surrounding the tubular shaft 16 and secured to the inner face of the bearing hub of the casing 19. On the forward end of the sliding collar 61 there is provided a thrust bearing 64 having a thrust ring 65 for engagement with a contact button 66 on the free end of the throw-out lever. An axial shifting of the sleeve causes the thrust ring 65 to push on the button 66 and thereby swing the throw-out lever 55 to move the clutch pressure plate 30 rearwardly against the force of the spring 50 and thereby disengage the clutch disc 38.

Figure 2:
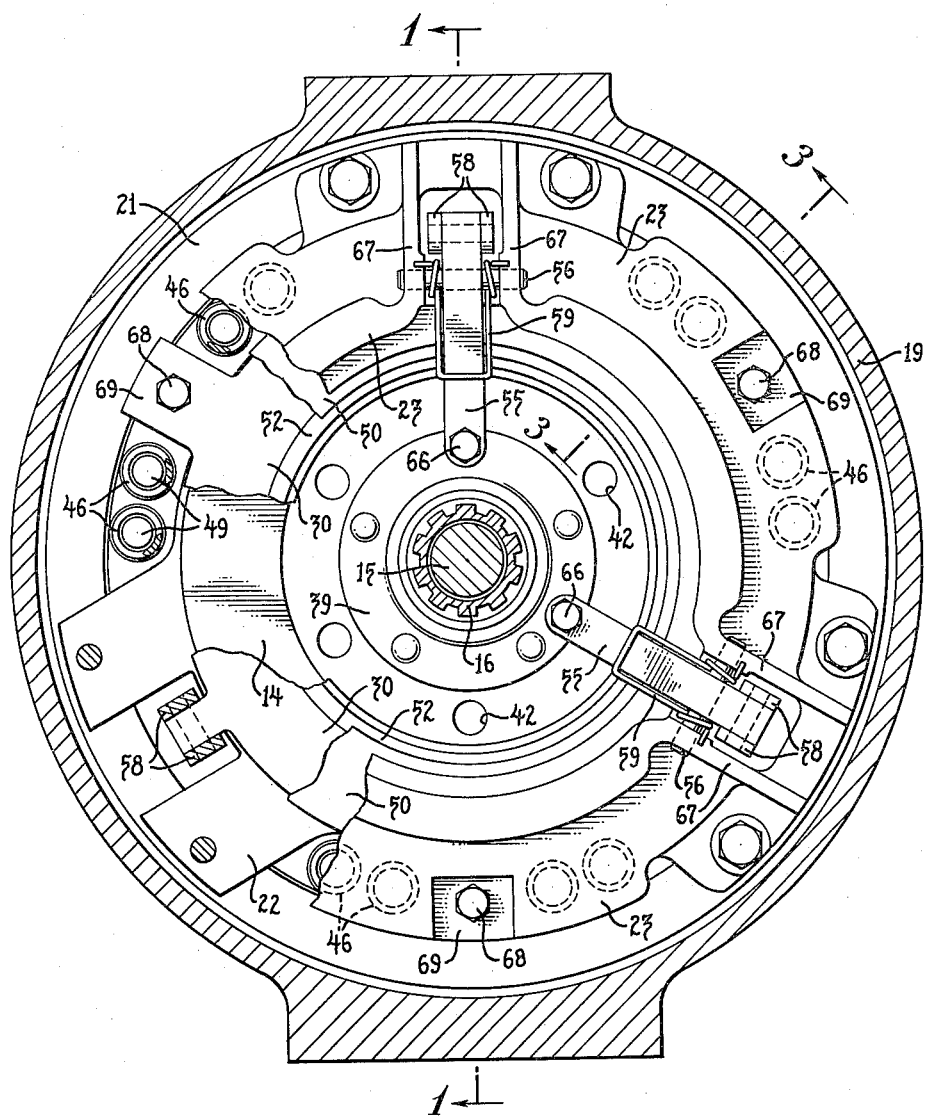
FIG. 2 is a transverse section view taken substantially in the plane of line 2—2 of FIG. 1.

The throw-out levers 55 of which three may be used as shown in FIG. 2, are uniformly spaced around the rear of the assembly and are supported on the pivot pins which extend between spaced lugs 67 extending rearwardly from the flywheel member 23.

For actuation of the front clutch 12, the operating mechanism includes a lost motion connecting means between the rear pressure plate 30 and the front pressure plate 29. One illustrative connecting means comprises a headed member 68 threadably engaged with the front pressure plate 29 and slidably extending through projecting ears 69 on the rear pressure plate 30 so that the head 70 of the member 68 engages the rear surface of the rear pressure plate 30 when the throw-out lever has moved that plate sufficiently far rearwardly.

Provision is made for adjusting the operating mechanism so that disengagement of the two clutches may take place simultaneously or sequentially as desired, with the rear clutch being disengaged ahead of the front clutch. To this end, the lost motion connectors 68 may be threaded into the front pressure plate so that the head 70 engages the rear surface of the rear pressure plate 30 when the clutches 12 and 13 are engaged. Alternatively, the lost motion connector 68 may be backed off from the rear pressure plate to provide sufficient lost motion so that the rear clutch 14 may be actuated independently and prior to the actuation of the forward clutch 12. A suitable locknut 71 is provided on the headed member 68 for locking it in position.

Figure 4:
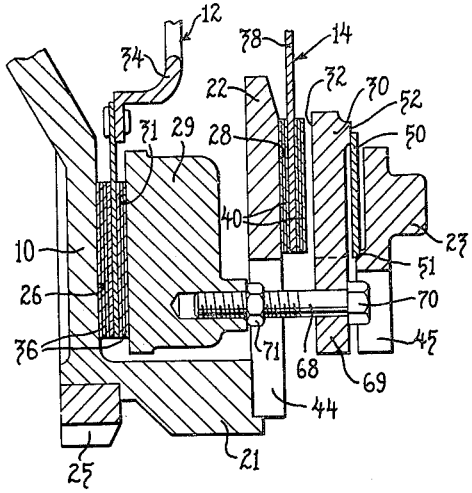

In operation with both clutches engaged, as shown in FIG. 3, to disengage first the rear or transmission clutch 14 the clutch arm 54 is moved forwardly to force the thrust ring 65 against the throw-out lever 55 and swing the latter to withdraw the rear pressure plate 30 from engagement with the friction pads 40 of the clutch disc 38. The rear clutch 14 then slips with respect to the friction driving surface 28 thereby stopping rotation of the tubular transmission shaft 16. At this point power will not be transmitted to the wheels of the vehicle but the power-take-off shaft 15 will continue to rotate. This position of the clutch mechanism is shown in FIG. 4.

Figure 5:
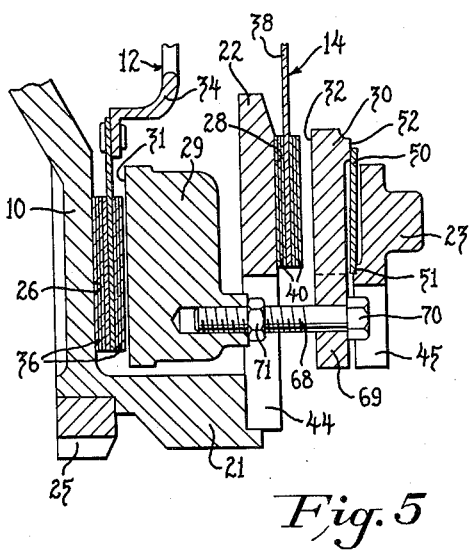

To disengage the front or power-take-off clutch 12, the forward movement of the clutch arm 54 is continued thereby further swinging the throw-out arm 55 to withdraw the rear pressure plate 30 sufficiently so that the head 70 of the lost motion connector 68 is engaged. The front pressure plate 29 is then pulled rearwardly against the force of the springs 46 thereby releasing the clutch disc 34. At this point both clutches are disengaged as shown in FIG. 5.

Upon release of the clutch operating arm 54 the springs 46 and 50 return the associated clutch plates to their engaged position. In the adjusted condition above described, the clutches are reengaged in the reverse order, that is the forward power-take-off clutch 12 is engaged first followed by engagement of the rear transmission clutch 14. The throw-out levers are returned to their normal at-rest position shown in FIG. 1.

It will be evident from the foregoing that the invention provides a new and improved dual friction clutch mechanism of novel and advantageous construction especially suited for use in tractors. Not only is air circulation substantially improved throughout the clutch mechanism but adjustments are easily made by virtue of the freedom from obstruction of the points at which adjustments are to be made. The clutch mechanism is dependable and rugged, easy to install and service, efficient and reliable in operation and its simple construction enables it to be manufactured at relatively low cost.

I claim as my invention:

1. In a dual clutch mechanism, in combination, a front rotary driving member presenting an annular friction driving surface on one face, an annular peripheral flange extending from said member, an intermediate flat annular member rigidly fixed to said flange in spaced parallel relation to said driving member and having an annular friction driving surface on its one face corresponding to said driving surface on said driving member, a rear annular support member fixed to said flange in spaced relation to both said driving faces, front and rear annular pressure plates disposed respectively between said front and intermediate members and between said intermediate and rear members and being shiftable axially of the driving member, a first shaft extending rearwardly from said mechanism and having its forward end piloted in said front driving member, a tubular shaft extending over said first shaft, said annular intermediate member having an inner edge spaced radially from said shafts, a clutch disc nonrotatably mounted on said first shaft and having its marginal edge portion interposed between the forward friction surface of the driving member and the front pressure plate, a second clutch disc nonrotatably mounted on said tubular shaft and having its marginal edge portion interposed between the friction surface on said intermediate annular member and the rear pressure plate, said clutch discs both having a plurality of openings extending axially through their central portions, said intermediate plate having outer marginal openings therethrough, a set of helical coil springs extending through the outer marginal openings of said intermediate member and acting between said rear annular support member and the front pressure plate, and a Belleville spring acting between said rear annular support member and the rear pressure plate, said springs all acting against the rear annular support to yieldingly urge said plates toward their respective friction surfaces thereby to drivingly engage both of said clutch discs, and means for retracting said pressure plates successively against the force of said springs to disengage said clutch discs.

2. In a clutch mechanism, in combination, a front rotary driving member presenting an annular friction driving surface on one face, an annular peripheral flange extending from said member, an intermediate flat annular member rigidly fixed to said flange in spaced parallel relation to said driving member and having an annular friction driving surface on its one face corresponding to said driving surface on said driving member, a rear annular support member fixed to said flange in spaced relation to both said driving faces, front and rear annular pressure plates disposed respectively between said front and intermediate members and between said intermediate and rear members and being shiftable axially of the driving member, a first shaft extending rearwardly from said mechanism and having its forward end piloted in said front driving member, a tubular shaft extending over said first shaft, said annular intermediate member having an inner edge spaced radially from said shafts, a clutch disc nonrotatably mounted on said first shaft and having its marginal edge portion interposed between the forward friction surface of the driving member and the front pressure plate, a second clutch disc nonrotatably mounted on said tubular shaft and having its marginal edge portion interposed between the friction surface on said intermediate annular member and the rear pressure plate, said clutch discs each having a plurality of openings extending axially through their central portions, said intermediate plate having outer marginal openings therethrough, a plurality of helical coil springs spaced around said shafts and extending through the intermediate member and acting between said rear annular support member and the front pressure plate, and a Belleville spring surrounding said shafts and acting between said rear annular support member and the rear pressure plate, said springs all acting against said rear annular support to yieldingly urge said plates toward their respective friction surfaces thereby to drivingly engage both of said clutch discs, throw-out means mounted on said rear annular support member and operative when moved a selected amount to retract one of said pressure plates against the force of its associated spring to disengage the clutch disc associated therewith, means for actuating said throw-out means, and a lost motion connection means between said one pressure plate and the other pressure plate for retracting said other pressure plate against the force of its associated spring when said throw-out means has been moved a further selected amount thereby to disengage the clutch disc associated therewith.

References Cited in the file of this patent

UNITED STATES PATENTS

| | | |
|---|---|---|
| 2,107,954 | Morton et al. | Feb. 8, 1938 |
| 2,384,405 | Spase | Sept. 4, 1945 |
| 2,613,777 | Carlson | Oct. 14, 1952 |
| 2,854,110 | Senkowski et al. | Sept. 30, 1958 |
| 2,899,897 | Ludwig | Aug. 18, 1959 |

FOREIGN PATENTS

| | | |
|---|---|---|
| 506,047 | Canada | Sept. 28, 1954 |
| 510,319 | Canada | Feb. 22, 1955 |
| 751,286 | Great Britain | June 27, 1956 |